(12) United States Patent
Sakai et al.

(10) Patent No.: US 7,243,545 B2
(45) Date of Patent: Jul. 17, 2007

(54) PHYSICAL QUANTITY SENSOR HAVING SPRING

(75) Inventors: Minekazu Sakai, Kariya (JP); Tameharu Ohta, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/795,322

(22) Filed: Mar. 9, 2004

(65) Prior Publication Data

US 2004/0182157 A1    Sep. 23, 2004

(30) Foreign Application Priority Data

Mar. 20, 2003  (JP) .............................. 2003-078197
Mar. 24, 2003  (JP) .............................. 2003-079594

(51) Int. Cl.
  *G01P 15/125*  (2006.01)
(52) U.S. Cl. ................... 73/514.32; 73/514.38
(58) Field of Classification Search ............ 73/514.32, 73/514.36, 514.38, 510
  See application file for complete search history.

(56) References Cited

U.S. PATENT DOCUMENTS

| 4,346,597 | A | * | 8/1982 | Cullen ...................... 73/510 |
| 4,432,000 | A | * | 2/1984 | Eriksson .................. 73/514.37 |
| 5,441,300 | A | | 8/1995 | Yokota et al. |
| 6,227,049 | B1 | | 5/2001 | Fujii |
| 6,272,926 | B1 | | 8/2001 | Fehrenbach et al. |
| 6,782,749 | B2 | * | 8/2004 | Pinter ...................... 73/514.38 |
| 2002/0112538 | A1 | | 8/2002 | Pinter et al. |
| 2005/0126287 | A1 | * | 6/2005 | Malametz ................ 73/514.32 |

FOREIGN PATENT DOCUMENTS

| JP | A-10-282136 | 10/1998 |
| JP | A-2000-180180 | 6/2000 |
| WO | WO 01/69267 A1 | * 9/2001 |

* cited by examiner

*Primary Examiner*—John E. Chapman
(74) *Attorney, Agent, or Firm*—Posz Law Group, PLC (57) ABSTRACT

A physical quantity sensor detects physical quantity. The sensor includes a plurality of springs, which have different spring constants, respectively. The sensor has a wide detection range of the physical quantity without assembling multiple sensors. Therefore, the sensor can be minimized. Further, since the sensor has an excellent linearity of the output characteristics, the sensor has a wide dynamic range and a high sensitivity.

20 Claims, 8 Drawing Sheets

PHYSICAL QUANTITY SENSOR HAVING SPRING

CROSS REFERENCE TO RELATED APPLICATIONS

This application is based on Japanese Patent Applications No. 2003-78197 filed on Mar. 20, 2003, and No. 2003-79594 filed on Mar. 24, 2003, the disclosures of which are incorporated herein by reference.

FIELD OF THE INVENTION

The present invention relates to a physical quantity sensor having a spring.

BACKGROUND OF THE INVENTION

A physical quantity sensor detects a physical quantity on the basis of a capacitance of a capacitor between a fixed electrode and a movable electrode. The sensor is, for example, disclosed in Japanese Patent Application Publication No. H05-304303 (i.e., U.S. Pat. No. 6,227,049). The sensor is used, for example an acceleration sensor.

In the above prior art, multiple sensors are necessitated to detect the acceleration in a wide range, i.e., to have a wide detection range. Therefore, a total size (i.e., total dimensions) of the multiple sensors becomes larger.

Further, another sensor is disclosed for example in Japanese Patent No. 2773495 (i.e., U.S. Pat. No. 5,441,300) and Japanese Patent Application Publication No. H10-282136. This sensor is a capacitance type acceleration sensor, and detects the acceleration on the basis of a capacitance change of a capacitor. The sensor has a certain relationship (i.e., output characteristics) between a capacitance change and the acceleration. It is required to have an excellent linearity of the relationship. However, the linearity of the relationship in the sensor is low. Specifically, the output of the sensor in accordance with the displacement of the movable electrode deviates from a predetermined line rapidly so that the sensor has a small detection range for detecting the acceleration. To secure the linearity in the detection range, the sensor has a spring-mass system. Therefore, it is difficult to secure the wide dynamic range of the acceleration. If the sensor is set to have the wide dynamic range, the sensitivity of the sensor becomes small. That is because the displacement of the movable electrode becomes small in a low acceleration range. Thus, the wide dynamic range and the high sensitivity in the sensor are incompatible. Therefore, it is required to manufacture two types of the sensors, which are the sensor having a low acceleration detection range and the sensor having a high acceleration detection range. Therefore, it is difficult to minimize the sensor.

SUMMARY OF THE INVENTION

In view of the above-mentioned problems, it is an object of the present invention to provide a physical quantity sensor having a wide detection range for detecting a physical quantity. Specifically, the sensor has a small size. More specifically, the sensor has a wide dynamic range of the acceleration and a high sensitivity.

A physical quantity sensor detects physical quantity. The sensor includes a plurality of springs, which have different spring constants, respectively. The sensor has a wide detection range of the physical quantity without assembling multiple sensors. Therefore, the sensor can be minimized. Further, since the sensor has an excellent linearity of the output characteristics, the sensor has a wide dynamic range and a high sensitivity.

Preferably, the sensor further includes a fixed electrode and a movable electrode connecting to the springs. The sensor is a capacitance type acceleration sensor. The movable electrode faces the fixed electrode at a predetermined distance therebetween so that a capacitor having a capacitance is provided. The spring is movable in accordance with the acceleration so that the distance between the movable and fixed electrodes is changed.

Preferably, the sensor detects the physical quantity in a detection direction. The springs have different longitudinal lengths perpendicular to the detection direction of the physical quantity, respectively. More preferably, the spring is provided by a pair of beams having a loop. The beams extend perpendicular to the detection direction of the physical quantity. The spring has a rectangular shape so that the loop is a rectangle.

Preferably, the sensor further includes a fixed electrode and a movable electrode connecting to the springs. The springs are movable in accordance with the physical quantity. The fixed electrode and the movable electrode provide a capacitor having a capacitance therebetween so that the physical quantity is detectable on the basis of the capacitance. More preferably, the sensor further includes a massive portion and a substrate. The movable electrode protrudes from the massive portion. The massive portion connects to the springs. The springs movably connect to the substrate. Furthermore preferably, the sensor detects the physical quantity in a detection direction. The massive portion extends to the detection direction of the physical quantity. The movable electrode extends perpendicular to the detection direction of the physical quantity. The springs extend perpendicular to the detection direction of the physical quantity. Furthermore preferably, the springs include first and second springs. The first spring is disposed between the massive portion and the second spring. The second spring is disposed between the first spring and the substrate. The first spring has a longitudinal length longer than that of the second spring.

Preferably, the sensor further includes a stopper. The springs include first and second springs. The stopper limits a motion of the first spring. The second spring supports the stopper. More preferably, the first spring is movable until the stopper contacts the first spring. More preferably, the sensor further includes a substrate and another stopper for limiting a motion of the second spring. The another stopper is fixed to the substrate.

Preferably, the sensor further includes a plurality of stoppers including first and second stoppers. The springs include first and second springs. The first stopper limits a motion of the first spring. The second stopper limits a motion of the second spring. The first spring includes a loop, which is movable in accordance with the physical quantity. The second spring is disposed in the loop of the first spring. More preferably, the first spring is movable until the first stopper contacts the first spring. The second spring together with the first spring is movable after the second stopper contacts the first spring. More preferably, the sensor further includes a fixed electrode and a movable electrode facing the fixed electrode. The first spring supports the first stopper, and connects to the movable electrode. The second spring supports the second stopper, and connects to the substrate.

Preferably, the sensor further includes a plurality of stoppers including first, second and third stoppers. The springs include first, second and third springs. The first stopper limits a motion of the first spring. The second stopper limits a motion of the second spring. The third stopper limits a motion of the third spring. The second spring supports the first stopper. The third spring supports the second stopper. More preferably, the sensor further includes a fixed electrode and a movable electrode facing the fixed electrode. The first, second and third springs connect to the movable electrode. The third stopper is fixed to the substrate.

Further, a physical quantity sensor detects physical quantity. The sensor includes a spring and a plurality of stoppers including first and second stoppers. The first stopper limits a motion of the spring at a first position. The second stopper limits a motion of the spring at a second position. The sensor has a wide detection range of the physical quantity without assembling multiple sensors. Therefore, the sensor can be minimized. Further, since the sensor has an excellent linearity of the output characteristics, the sensor has a wide dynamic range and a high sensitivity.

Preferably, the spring is movable until the first stopper contacts the first spring. The spring has a first spring characteristic until the second stopper contacts the spring. The spring has a second spring characteristic after the second stopper contacts the spring.

Preferably, the stoppers further include a third stopper. The third stopper limits a motion of the spring at a third position.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

The inventors preliminarily manufactured a physical quantity sensor as a comparison. The sensor is a capacitance type acceleration sensor 101 shown in FIGS. 3A-3C. The sensor 101 detects acceleration in X-axis, i.e., the sensor 101 detects single directional acceleration. The sensor 101 includes a semiconductor substrate 10 made of silicon and the like. The substrate 10 has multiple grooves 11 for providing multiple pairs of fixed electrodes 1 and movable electrodes 2. A pair of the fixed electrode 1 and the movable electrode 2 faces each other in the X direction so that it forms a capacitor having a capacitance. A massive portion 3 extends to the X direction. The movable electrodes 2 protrude from the massive portion 3 in a Y direction so that the movable electrodes 2 have a comb-teeth shape. The massive portion 3 has two ends, both of which connect to the substrate 10 so that the massive portion 3 is displaceable (i.e., movable) in the X direction. Both ends of the massive portion 3 connect to springs 4, respectively. Each spring 4 is movable in accordance with the acceleration.

Figure 3A:
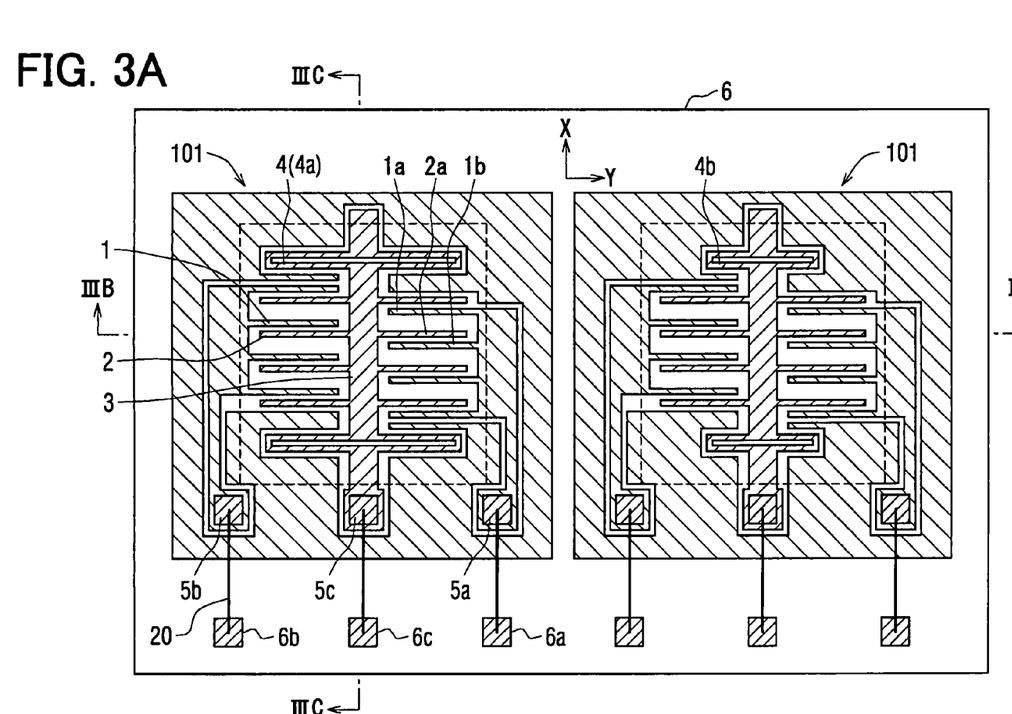
FIG. 3A is a plan view showing a physical quantity sensor as a comparison.
Figure 3B:
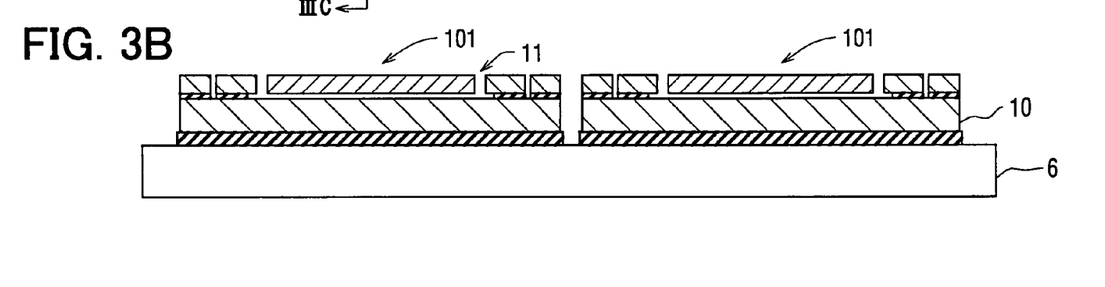
FIG. 3B is a cross sectional view showing the comparison sensor taken along line IIIB-IIIB in FIG. 3A.
Figure 3C:
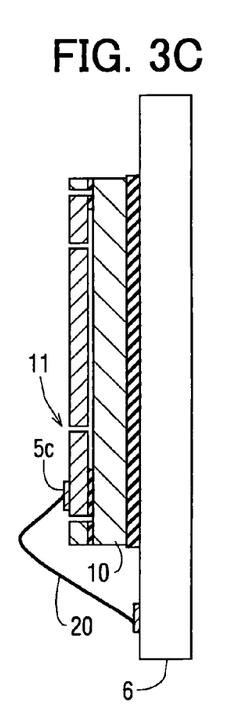
FIG. 3C is a cross sectional view showing the comparison sensor taken along line IIIC-IIIC in FIG. 3A, according to the first embodiment.

The fixed electrode 1 extends in the Y direction in order to face the movable electrode 2 in the X direction, and are connected to electrode pads 5a, 5b, respectively. The movable electrode 2 connects to an electrode pad 5c. The pads 5a-5c are made of aluminum and the like. The pads 5a-5c are connected to other electrode pads 6a-6c with a bonding wire 20. The pads 6a-6c are disposed on a circuit board 6 including other circuit chips such as a mother circuit board. The pads 6a-6c connect to an outside circuit (not shown). Thus, the pads 5a-5c are connected to the outside circuit through the pads 6a-6c and the bonding wire 20.

Here, one movable electrode 2a is disposed between one fixed electrode 1a and another fixed electrode 1b, which are adjacent together. When the acceleration is applied to the sensor 101 in the X direction, the spring 4 is displaced in the X direction so that a distance between the movable electrode 2a and the fixed electrode 1a, 1b is changed in accordance with the acceleration. Therefore, a capacitance C1 of a capacitor 21 formed between the fixed electrode 1a and the movable electrode 2a is changed, and another capacitance C2 of a capacitor 22 formed between the fixed electrode 1b and the movable electrode 2a is also changed.

Figure 4:
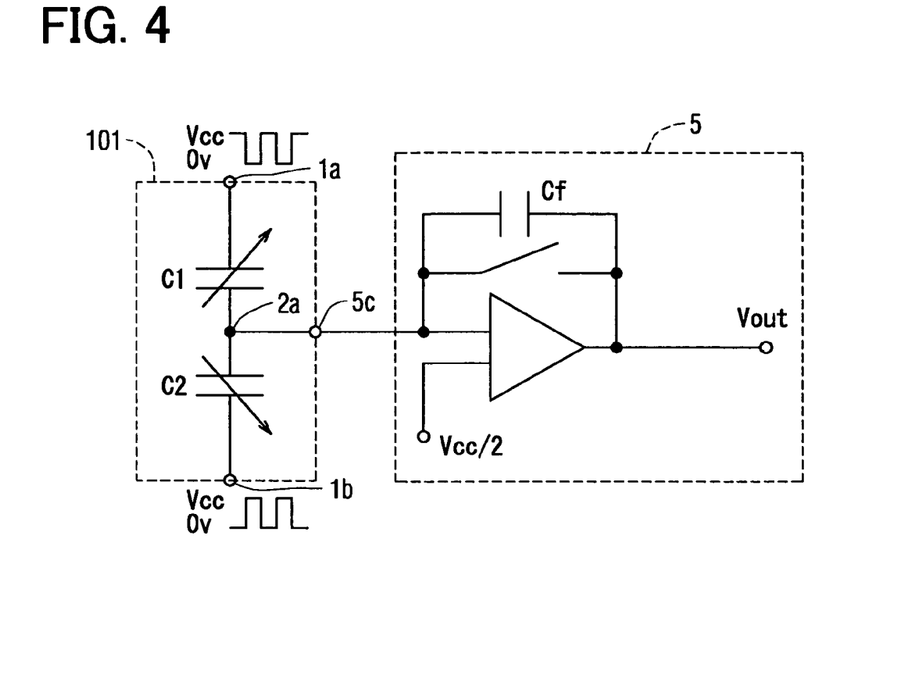
FIG. 4 is a circuit diagram showing an equivalent circuit of the comparison sensor shown in FIGS. 3A-3C, according to the first embodiment.

An equivalent circuit diagram of this sensor 101 is shown on a left side of FIG. 4. In FIG. 4, a pulsed electric voltage Vcc is applied to the fixed electrode 1a, 1b. Here, the pulsed electric voltage Vcc oscillates between zero voltage and a predetermined voltage Vcc. In this case, when the acceleration is applied to the sensor 101, and the capacitances C1, C2 are changed, a difference between the capacitances C1, C2 (i.e., a capacitance change $\Delta C$, $\Delta C = C1 - C2$) is generated. The capacitance change $\Delta C$ is detected through the movable electrode 2a, i.e., the capacitance change $\Delta C$ is retrieved from the movable electrode 2a. The capacitance change $\Delta C$ retrieved from the movable electrode 2a is detected by a circuit such as a switched capacitor circuit 5. The switched capacitor circuit 5 shown on a right side of FIG. 4 converts the capacitance change $\Delta C$ to an output voltage Vout. That is:

$$V\text{out} = (C1 - C2) \cdot Vcc / Cf.$$

Here, a half of the output voltage Vcc/2 is applied to the switched capacitor circuit 5, and a capacitance Cf is disposed between an input and output sides of the switched capacitor circuit 5. Thus, the acceleration is detected.

In a case where the sensor 101 detects the acceleration in a wide range, multiple sensors 101 are prepared for detecting the wide range acceleration. That is, multiple sensors 100 having a different detection range can detect the acceleration in a range between a comparatively small acceleration and a comparatively large acceleration. In this case, the sensors 101 include the spring 4, the fixed electrode 1, the movable electrode 2, and the massive portion 3, each of which has different dimensions so that the sensor 101 has a different detection range. For example, as shown in FIG. 3, the sensor 101 includes two sensors 101, which include the springs 4 having a different length. The sensor 101 disposed on the left side in FIG. 3A includes a long spring 4a, so that the sensor 101 can detect the comparatively small acceleration. The sensor 101 disposed on the right side in FIG. 3A includes a short spring 4b, so that the sensor 101 can detect the comparatively large acceleration. Thus, the sensors 101 can have the wide detection range. However, a total size (i.e., total dimensions) of the sensors 101 becomes larger.

Figure 1A:
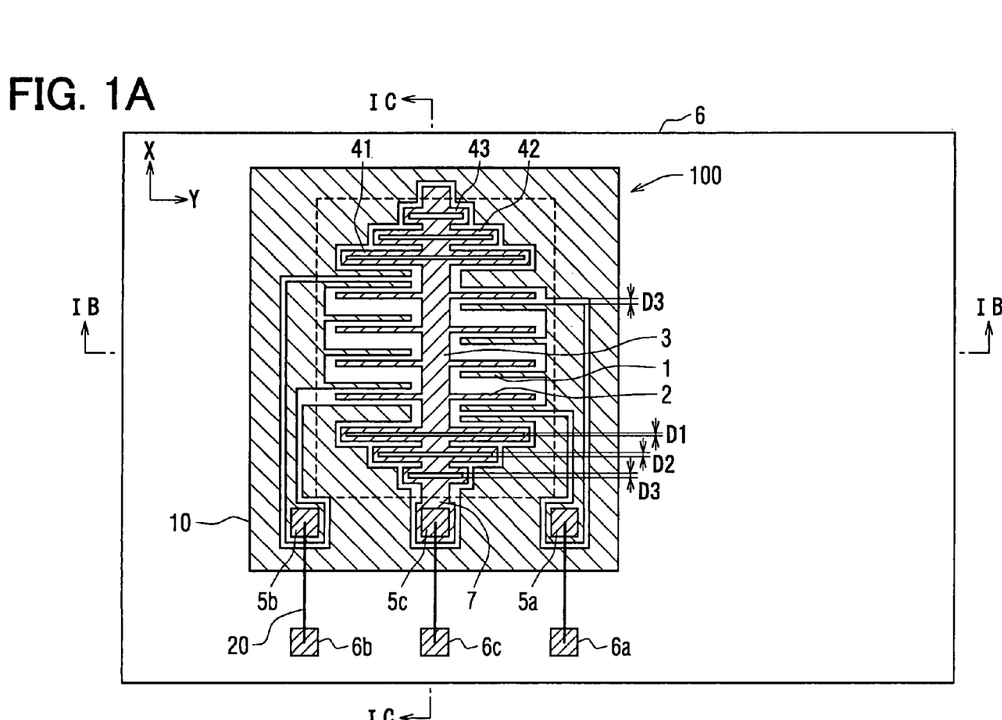
FIG. 1A is a plan view showing a physical quantity sensor.
Figure 1B:
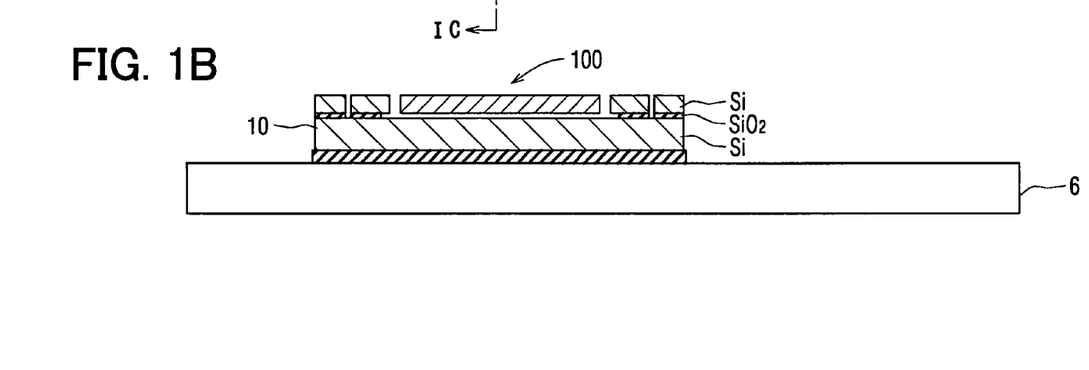
FIG. 1B is a cross sectional view showing the sensor taken along line IB-IB in FIG. 1A.
Figure 1C:
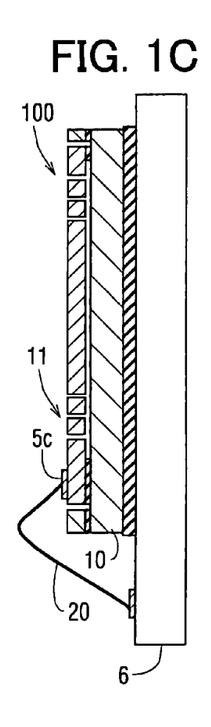
FIG. 1C is a cross sectional view showing the sensor taken along line IC-IC in FIG. 1A, according to a first embodiment of the present invention.

In view of the above comparison, a physical quantity sensor 100 according to a first embodiment of the present invention is provided. FIGS. 1A-1C show the sensor 100. The sensor 100 includes multiple springs 41-43 having a different spring constant. The springs 41-43 are displaced in accordance with the acceleration. In this case, for example, the sensor 100 includes three different springs 41-43. The springs 41-43 are disposed on both ends of the massive portion 3. The spring 41 has the longest beams, and the spring 43 has the shortest beams. The massive portion 3 is supported on the substrate 10 through anchors 7 in order to support three springs 41-43. Each spring 41-43 includes a pair of beams extending in the Y direction. The spring 41 has a distance D1 between a pair of beams of the spring 41, the spring 42 has a distance D2 between a pair of beams of the spring 42, and the spring 43 has a distance D3 between a pair of beams of the spring 43. A distance D4 between the movable electrode 2 and the fixed electrode 1 is provided such that:

$$D1 < D2 < D3 = D4.$$

When the comparatively small acceleration is applied to the sensor 100, the longest spring 41 is displaced. In this case, when the spring 41 is displaced by the distance D1, i.e., a pair of the beams of the spring 41 contacts each other, the displacement of the spring 41 is limited to displace.

Further, a comparatively medium acceleration is applied to the sensor 100, which is larger than the small acceleration, the second longest spring 42 is displaced. At that time, the beams of the spring 41 keep in contact each other. In this case, when the spring 42 is displaced by the distance D2, i.e., a pair of the beams of the spring 42 contacts each other, the displacement of the spring 42 is limited.

Furthermore, the comparatively large acceleration is applied to the sensor 100, which is larger than the medium acceleration, the shortest spring 43 is displaced. At that time, the beams of the spring 41 and the beams of the spring 42 keep in contact each other. In this case, when the spring 43 is displaced by the distance D3, i.e., a pair of the beams of the spring 43 contacts each other, the displacement of the spring 43 is limited. Thus, the sensor 100 can detect the acceleration until the beams of the spring 43 contact each other.

Thus, when the springs 41-43 having a different length are displaced, respectively, the distance D4 between the movable electrode 2 and the fixed electrode 1 is also changed in accordance with the displacement of the springs 41-43. Specifically, the distance D4 can be changed in relation to the acceleration in a range between the small acceleration and the large acceleration. Therefore, the sensor 100 can detect the acceleration in a wide range, i.e., the sensor 100 has a wide detection range.

Figure 2A:
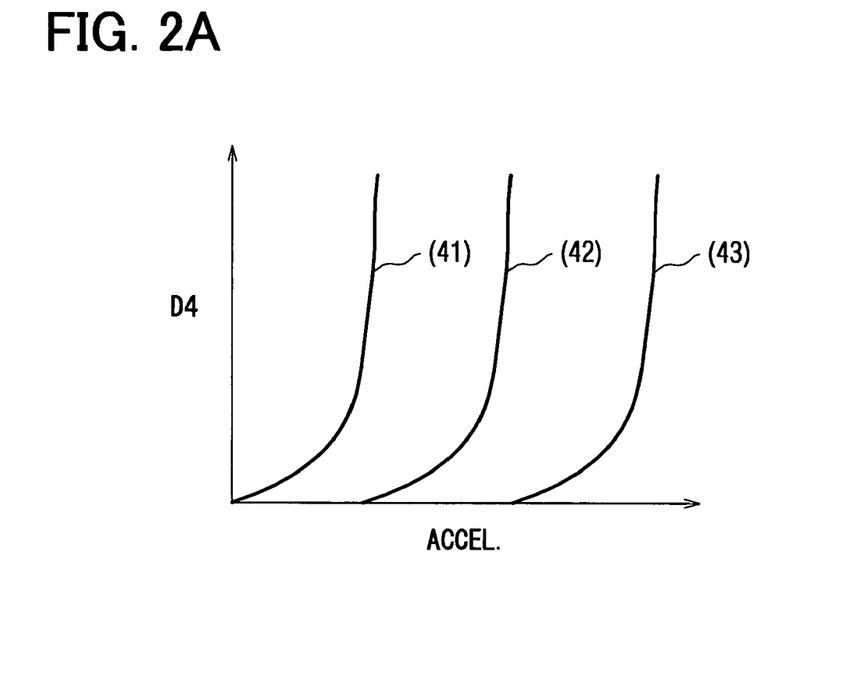
FIG. 2A is a graph showing a relationship between a distance D4 and an acceleration applied to a comparison sensor shown in FIGS. 3A-3C.
Figure 2B:
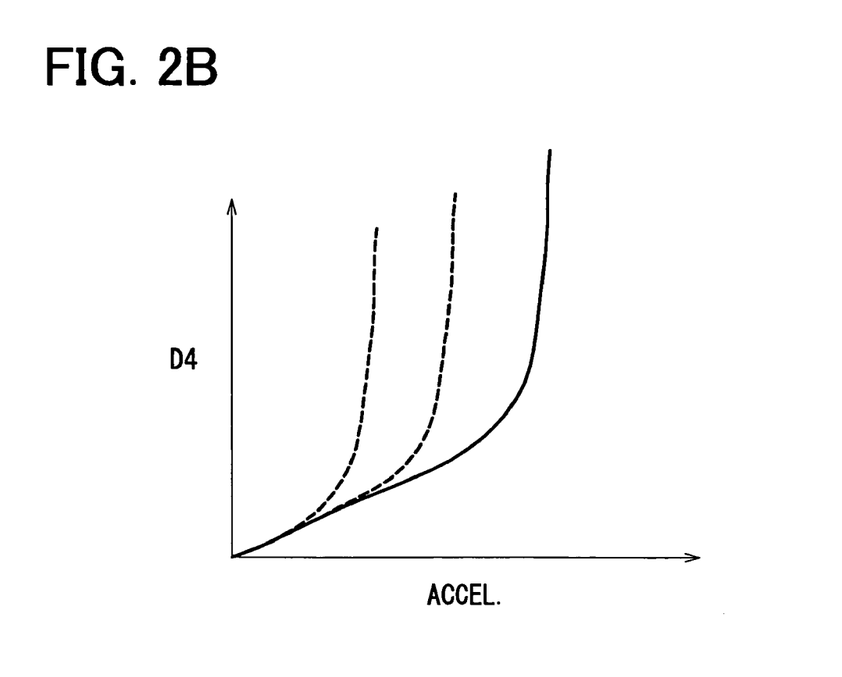
FIG. 2B is a graph showing a relationship between the distance D4 and the acceleration applied to the sensor shown in FIGS. 1A-1C.

FIG. 2A shows a relationship between the acceleration and the distance D4 between the movable electrode 2 and the fixed electrode 1 in the sensor 101 shown in FIGS. 3A-3C. FIG. 2B shows a relationship between the acceleration and the distance D4 between the movable electrode 2 and the fixed electrode 1 in the sensor 100 shown in FIGS. 1A-1C. In FIG. 2A, a left curve corresponds to the sensor 101 having the spring 4, which has the same dimensions as the longest spring 41. A middle curve corresponds to the sensor 101 having the spring 4, which has the same dimensions as the second longest spring 42. A right curve corresponds to the sensor 101 having the spring 4, which has the same dimensions as the shortest spring 43. In FIG. 2A, the distance D4 in the sensor 101 is increased rapidly in accordance with the acceleration. Therefore, each curve has a large curvature. However, in FIG. 2B, the distance D4 in the sensor 100 is changed smoothly in accordance with the acceleration.

Further, since the sensor 100 has the wide detection range of the acceleration, the sensor 100 can detect the acceleration in a wide range without assembling multiple sensors 100. Thus, the sensor 100 can be minimized, i.e., the sensor 100 becomes small. Further, since the sensor 100 has an excellent linearity of the output characteristics, the sensor 100 has a wide dynamic range and a high sensitivity.

Second Embodiment

The inventors preliminarily manufactured a physical quantity sensor as another comparison. The sensor is a capacitance type acceleration sensor 201 shown in FIG. 10. The sensor 201 includes a substrate having multiple grooves so that the fixed electrode 1 and the movable electrodes 2 are formed. The fixed electrode 1 includes a right side fixed electrode 1c and a left side fixed electrode 1d. The right side and left side fixed electrodes 1c, 1d face the movable electrode 2 in the X direction, which is a detection direction of the acceleration so that capacitors having a capacitance are formed, respectively.

Figure 10:
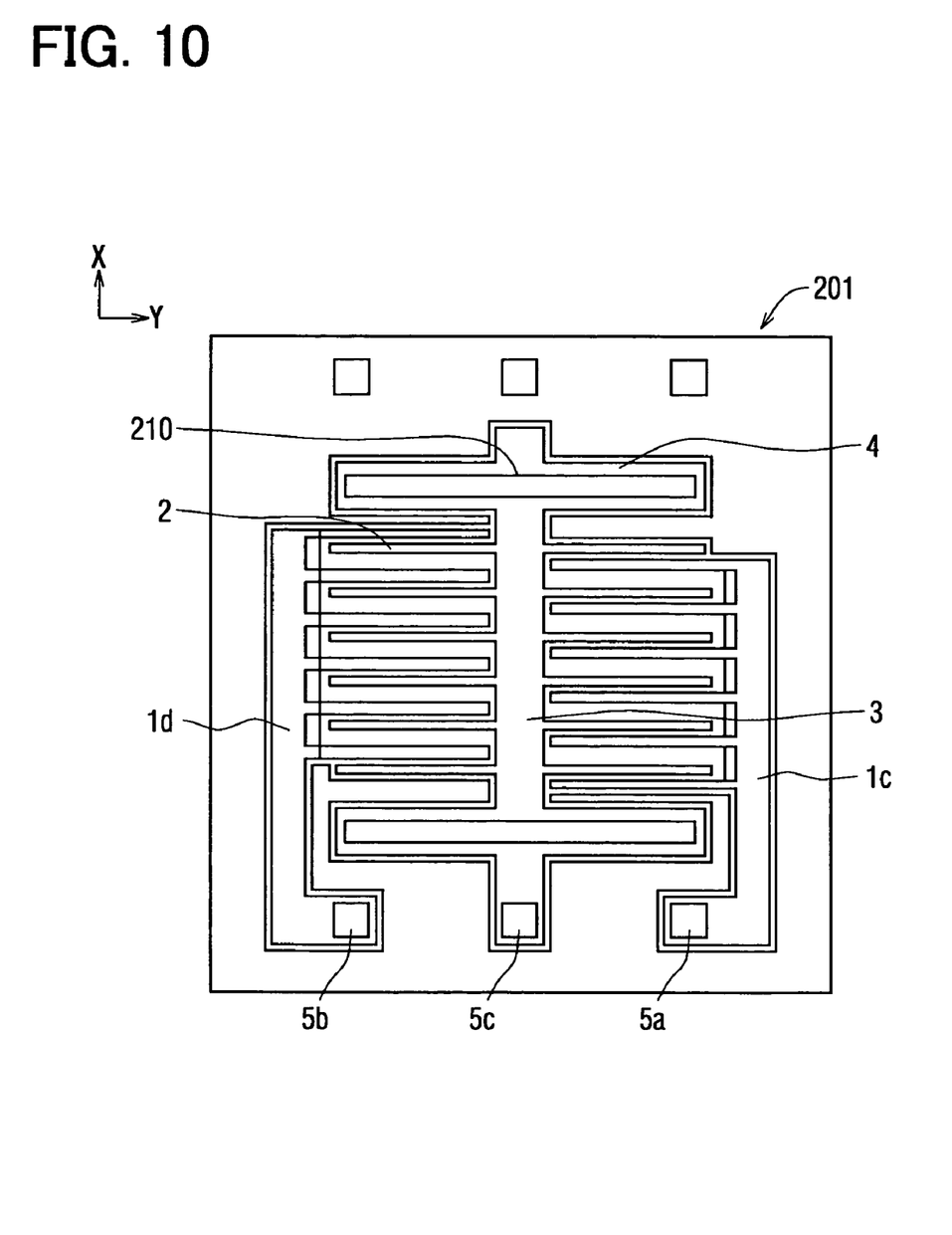
FIG. 10 is a plan view showing a physical quantity sensor as another comparison, according to the second embodiment.

The massive portion 3 extends to the X direction. The movable electrodes 2 protrude from the massive portion 3 in the Y direction so that the movable electrodes 2 have a comb-teeth shape. The massive portion 3 has two ends, both of which connect to the substrate 10 so that the massive portion 3 is displaceable (i.e., movable) in the X direction. Both ends of the massive portion 3 connect to springs 4, respectively. Each spring 4 is movable in the X direction in accordance with the acceleration. The spring 4 has a loop provided by a pair of beams. A stopper 210 limits a displacement of the spring 4.

The right side and left side fixed electrodes 1c, 1d extend in the Y direction in order to face the movable electrode 2 in the X direction, and are connected to electrode pads 5a, 5b, respectively. The movable electrode 2 connects to an electrode pad 5c. The pads 5a-5c are made of aluminum and the like. The pads 5a-5c are connected to the outside circuit with a bonding wire (not shown).

Figure 6:
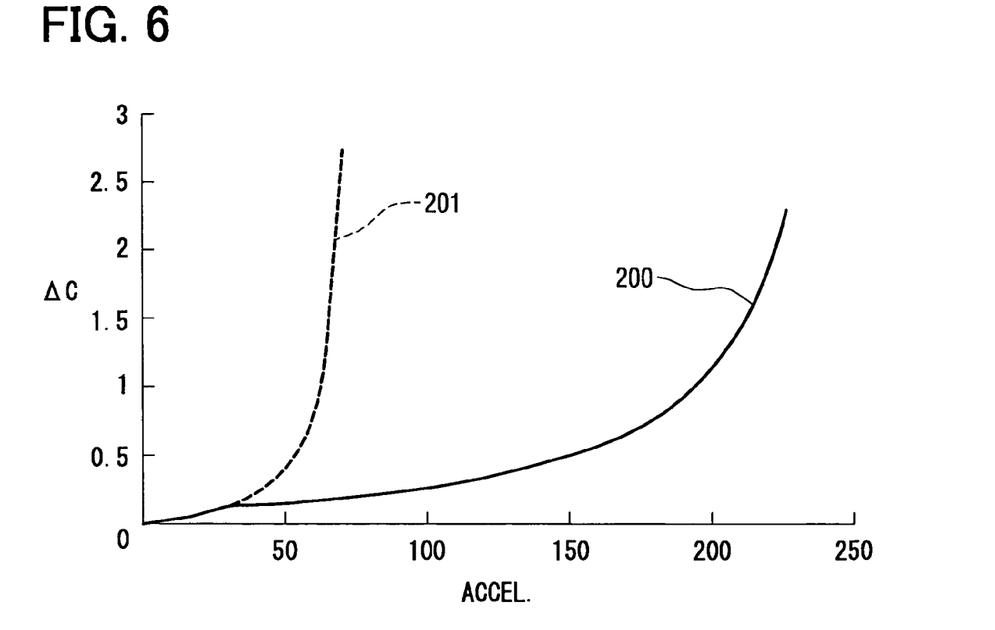
FIG. 6 is a graph showing a relationship between the acceleration and a capacitance change $\Delta C$ in various sensors, according to the second embodiment.

The sensor 201 shows a relationship between the capacitance change ΔC and the acceleration shown as dotted line in FIG. 6. The linearity of the relationship in the sensor 201 is low. Specifically, the output of the sensor 201 in accordance with the displacement of the movable electrode 2 deviates from a predetermined line rapidly so that the sensor 201 has a small detection range for detecting the acceleration.

Figure 5:
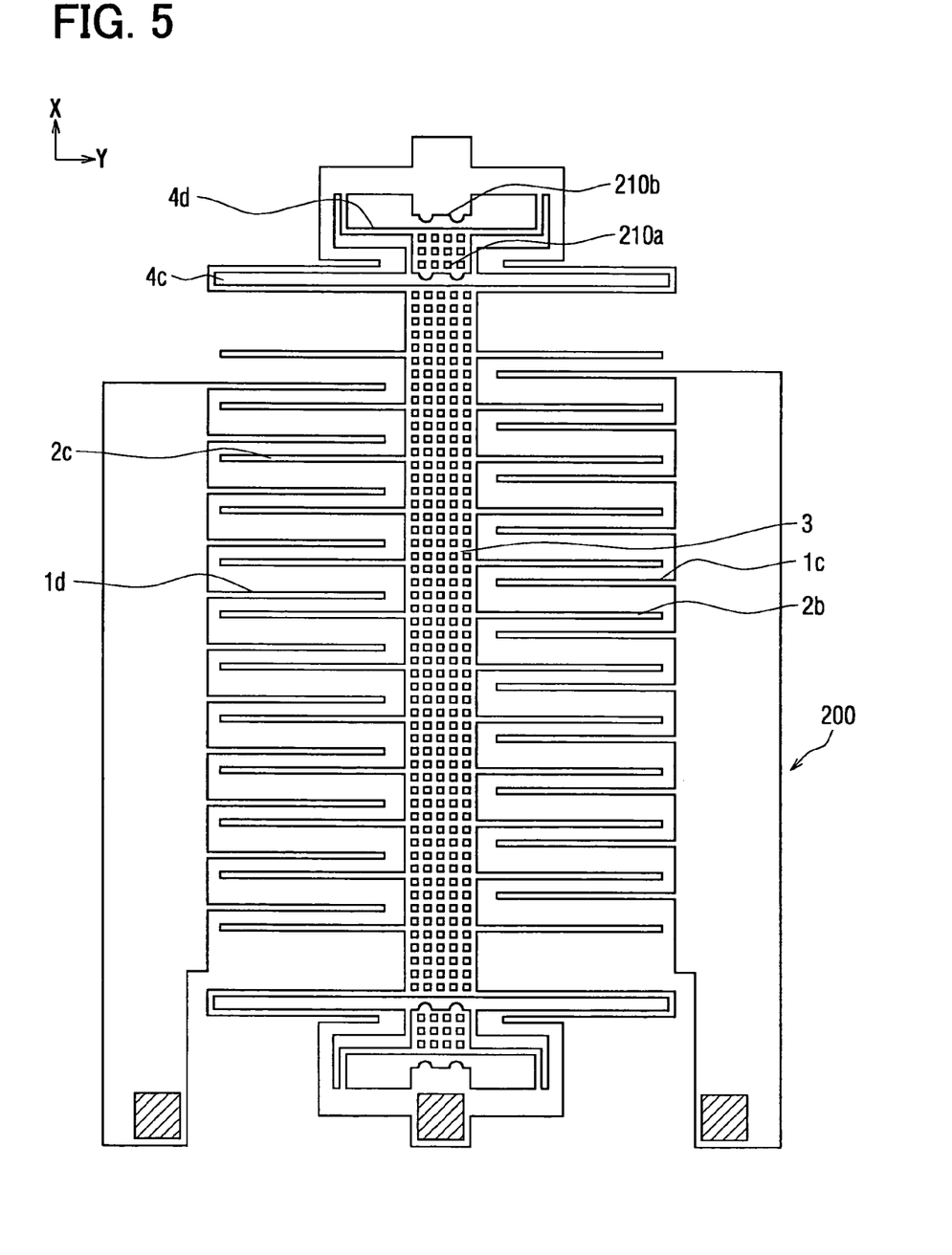
FIG. 5 is a plan view showing a physical quantity sensor according to a second embodiment of the present invention.

In view of the above comparison, a physical quantity sensor 200 according to a second embodiment of the present invention is provided. As shown in FIG. 5, the sensor 200 includes the massive portion 3, the first and second springs 4c, 4d and the first and second stoppers 210a, 210b. The first and second springs 4c, 4d are disposed on both ends of the massive portion 3, and are movable, i.e., displaceable in the X direction. Here, the X direction is an acceleration detection direction. The first and second springs 4c, 4d have a loop, respectively. The first and second stoppers 210a, 210b limit displacements of the first and second springs 4c, 4d, respectively. Specifically, the stoppers 210a, 210b limit the displacement range of the springs 4c, 4d. The first stopper 210a for limiting the first spring 4c is supported on the second spring 4d. The second stopper 210b for limiting the second spring 4d is supported on the second spring 4d. The second spring 4d has a longitudinal length shorter than that of the first spring 4c so that the spring constant of the second spring 4d is larger than that of the first spring 4c. Specifically, the length of the second spring 4d in the Y direction becomes short. Here, the Y direction is perpendicular to the acceleration detection direction, i.e., the X direction.

The right side and left side fixed electrodes 1c, 1d face the right side and left side movable electrodes 2b, 2c in the X direction so that capacitors having a capacitance are formed, respectively. The massive portion 3 extends to the X direction. The right side and left side movable electrodes 2b, 2c protrude from the massive portion 3 in the Y direction so that the movable electrodes 2b, 2c have a comb-teeth shape. The right side and left side fixed electrodes 1c, 1d also have a comb-teeth shape. Each spring 4c, 4d is movable in the X direction in accordance with the acceleration. The spring 4c, 4d has the loop provided by a pair of beams.

In the sensor 200, the first stopper 210a and the massive portion 3 include multiple openings. However, they can be used for the sensor 200 without any opening.

The displacement of the movable electrodes 2b, 2c are provided by the spring-mass system composing the first spring 4c and the massive portion 3, firstly. When the acceleration is applied to the sensor 200, the massive portion 3 receives an inertial force corresponding to the acceleration. Then, the first spring 4c is displaced until the inertial force is balanced to the spring force of the first spring 4c. The movable electrodes 2b, 2c are also displaced together with the displacement of the first spring 4c. Thus, the displacement of the movable electrodes 2b, 2c is decided.

Further, when the acceleration becomes larger, the displacement of the movable electrodes 2b, 2c is also increased in proportion to the increase of the acceleration. The displacement of the movable electrodes 2b, 2c is defined by the spring constant of the first spring 4c until the first stopper 210a limits the displacement, i.e., until the first stopper 210a contacts the beam of the first spring 4c.

The first stopper 210a for limiting the first spring 4c is supported on the second spring 4d. Further, the spring constant of the second spring 4d is larger than that of the first spring 4c. Therefore, even when the first stopper 210a contacts the first spring 4c, the massive portion 3 can be displaced. In this case, the displacement of the massive portion 3 is defined by the spring constant of the second spring 4d. Therefore, the increase of the displacement of the massive portion 3 corresponding to the increase of the acceleration is smaller than that in a case where the displacement is defined by the spring constant of the first spring 4c. Specifically, the displacement of the massive portion 3 is suppressed in the high acceleration range. Thus, the fixed electrodes 1c, 1d do not contact the movable electrodes 2b, 2c until the second stopper 210b contacts the beam of the second spring 4d. That is, the limitation of the second stopper 210b for limiting the second spring 4d becomes larger. Therefore, the sensor 200 can detect the high acceleration range, i.e., the sensor 200 has the large acceleration detection range, so that the sensor 200 has a wide dynamic range of the acceleration. Further, the sensor has high sensitivity substantially.

The sensor 200 shows a relationship between the capacitance change ΔC and the acceleration shown as solid line in FIG. 6. The linearity of the relationship in the sensor 200 is high. Specifically, the output of the sensor 200 in accordance with the displacement of the movable electrodes 2c, 2d does not deviate from a predetermined line substantially in a wide range. In the dotted line representing the output characteristic of the sensor 201, the capacitance change ΔC as the output of the sensor 201 is rapidly increased when the acceleration is increased. Therefore, the dotted line has a large curvature. However, in the solid line representing the output characteristic of the sensor 200, the capacitance change ΔC as the output of the sensor 200 is gently (i.e., slowly) increased when the acceleration is increased. That is, a region of the curve, which has a large curvature, is shifted to the larger acceleration side. That is because the first stopper 210a limits the displacement of the first spring 4c until the first stopper 210a contacts the first spring 4c, and after that the second spring 4d is used for the displacement so that the sensor 200 can have the wide detection range of the acceleration. Thus, the linearity of the relationship between the capacitance change ΔC and the acceleration is improved so that the sensor 200 has the wide detection range for detecting the acceleration.

Further, since the sensor 200 has the wide detection range of the acceleration, the sensor 200 can detect the acceleration in a wide range without assembling multiple sensors 200. Thus, the sensor 200 can be minimized, i.e., the sensor 200 becomes small. Further, since the sensor 200 has an excellent linearity of the output characteristics, the sensor 200 has a wide dynamic range and a high sensitivity.

Third Embodiment

Figure 7:
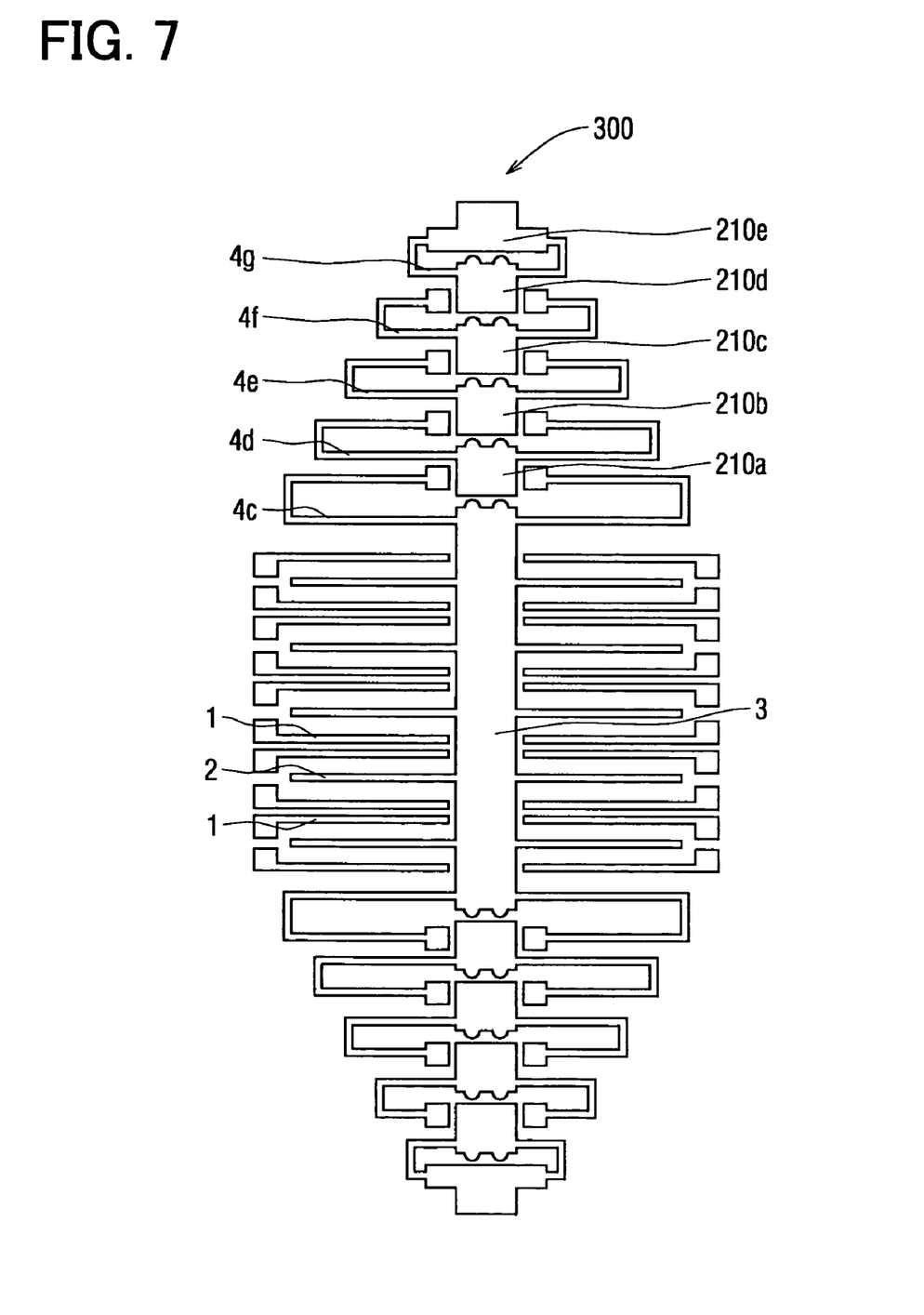
FIG. 7 is a plan view showing a physical quantity sensor according to a third embodiment of the present invention.

A physical quantity sensor 300 according to a third embodiment of the present invention is shown in FIG. 7. The sensor 300 includes multiple springs 4c-4g and multiple stoppers 210a-210e. In FIG. 7, five springs 4c-4g and five stoppers 210a-210e are disposed on both ends of the massive portion 3. The five springs 4c-4g have different spring constants, respectively.

The first stopper 210a for limiting the first spring 4c is supported on the second spring 4d. The first spring 4c has a latitudinal length longer than that of the second spring 4d so that the spring constant of the first spring 4c is smaller than that of the second spring 4d. The second stopper 210b for limiting the second spring 4d is supported on the third spring 4e. The second spring 4d has a latitudinal length longer than that of the third spring 4e so that the spring constant of the second spring 4d is smaller than that of the third spring 4e. The third stopper 210c for limiting the third spring 4e is supported on the fourth spring 4f. The third spring 4e has a latitudinal length longer than that of the fourth spring 4f so that the spring constant of the third spring 4e is smaller than that of the fourth spring 4f. The fourth stopper 210d for limiting the fourth spring 4f is supported on the fifth spring 4g. The fourth spring 4f has a latitudinal length longer than that of the fifth spring 4g so that the spring constant of the fourth spring 4f is smaller than that of the fifth spring 4g.

In this case, the output characteristic of the sensor 300 has multiple inflection points. Specifically, in the output characteristic of the sensor 300, the capacitance change ΔC as the output of the sensor 300 is much gently, i.e., smoothly increased when the acceleration is increased. Thus, the linearity of the relationship between the capacitance change ΔC and the acceleration is much improved so that the sensor 300 has the wide detection range for detecting the acceleration.

Further, the sensor 300 can be minimized. Furthermore, since the sensor 300 has an excellent linearity of the output characteristics, the sensor 300 has a wide dynamic range and a high sensitivity.

Fourth Embodiment

Figure 8:
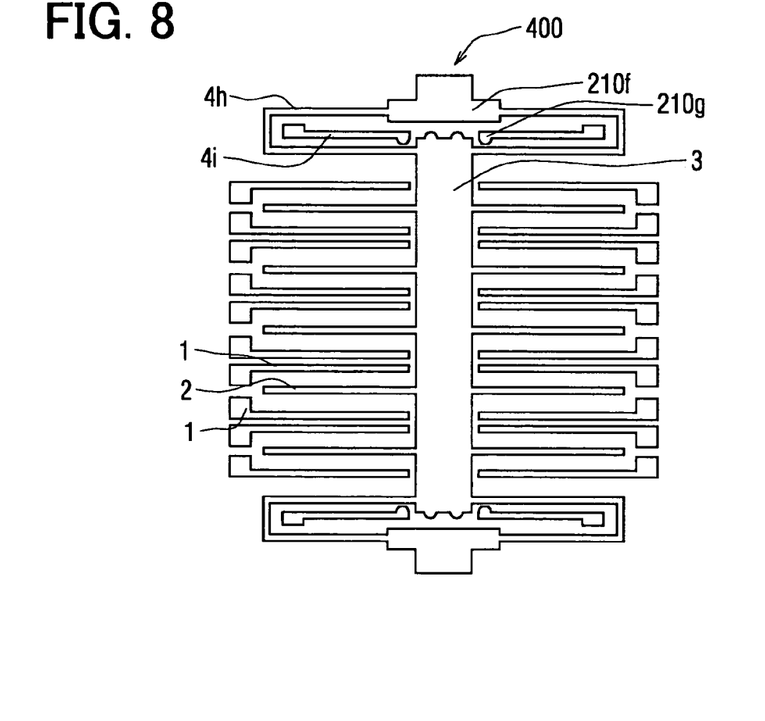
FIG. 8 is a plan view showing a physical quantity sensor according to a fourth embodiment of the present invention.

A physical quantity sensor 400 according to a fourth embodiment of the present invention is shown in FIG. 8. The sensor 400 includes two springs 4h, 4i and two stoppers 210f, 210g. The second type spring 4i has a different construction from the first type spring 4h. The second type stopper 210g also has a different construction from the first type stopper 210f. The second type stopper 210g is disposed on one end of the second type spring 4i. In this case, when the second stopper 210g contacts the first type spring 4h, a total spring constant of the springs 4h, 4i is changed.

In FIG. 8, the second type spring 4i is disposed in a loop of the first type spring 4h. The spring constant of the second type spring 4i is larger than that of the first type spring 4h. The second type stopper 210g for limiting the second type spring 4i is formed integrally with the second type spring 4i in order to abut (i.e., contact) on the first type spring 4h. Therefore, when the acceleration is applied to the sensor 400, the first type spring 4h is displaced until the second type stopper 210g contacts the first type spring 4h. Thus, the displacement of the movable electrode 2 is defined by the first type spring 4h. Further, when the acceleration becomes larger, the second type stopper 210g contacts the first type spring 4h. After that, the first type spring 4h together with the second type spring 4i is displaced in accordance with the acceleration. In this case, the total spring constant of the first type spring 4h together with the second type spring 4i becomes larger, so that the displacement of the movable electrode 2 is defined by the total spring constant of the first type and second type springs 4h, 4i until the first type stopper 210f limits the displacement, i.e., until the first type stopper 210f contact the first type spring 4h together with the second type spring 4i.

Thus, the sensor 400 has the wide detection range for detecting the acceleration. Further, the sensor 400 can be minimized. Furthermore, since the sensor 400 has an excellent linearity of the output characteristics, the sensor 400 has a wide dynamic range and a high sensitivity.

The sensor 400 can have the different electric potentials of the first type and second type springs 4h, 4i since the first type spring 4h has a different construction from the second type spring 4i. Therefore, when the second type spring 4i, i.e., the second type stopper 210g contacts the first type spring 4h, a switching signal can be generated so that the sensor 400 has a switching function. Therefore, the switching signal is generated at the inflection point where the second type stopper 210g contacts the first type spring 4h. Thus, the sensor can provide to switch a gain of a signal processing circuit, filtering characteristics and/or signal characteristics in accordance with the acceleration.

Fifth Embodiment

Figure 9:
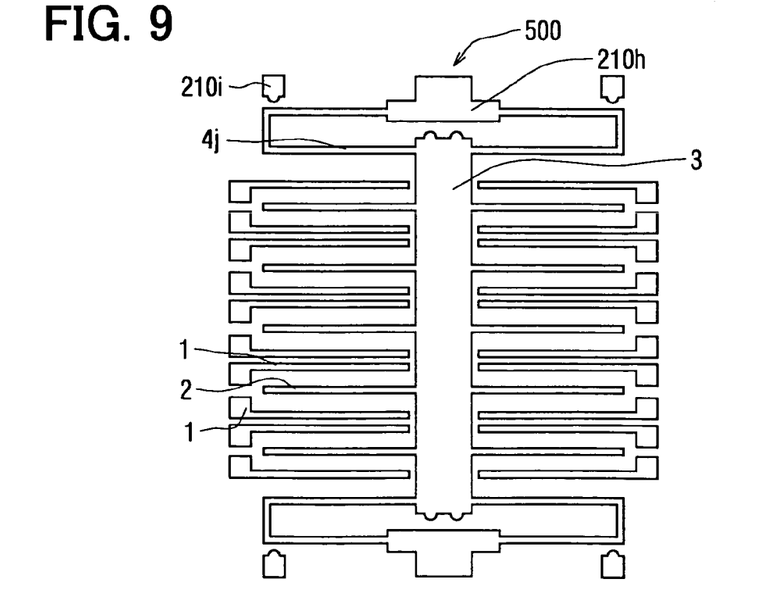
FIG. 9 is a plan view showing a physical quantity sensor according to a fifth embodiment of the present invention.

A physical quantity sensor 500 according to a fifth embodiment of the present invention is shown in FIG. 9. The sensor 500 includes a single spring 4j and two stoppers 210h, 210i. The second type stopper 210i is disposed at a predetermined position in a movable area of the single spring 4j. Specifically, the second stopper 210i is disposed on a middle position in the movable area. Therefore, when the single spring 4j contacts the second type stopper 210i, the support point of the single spring 4j is changed. Thus, the sensor 500 has the same effect as a case where the longitudinal length of the single spring 4j is changed. Specifically, the sensor 500 has the same function as the sensor 200 shown in FIG. 5.

Such changes and modifications are to be understood as being within the scope of the present invention as defined by the appended claims.

What is claimed is:

1. A physical quantity sensor for detecting physical quantity, the sensor comprising:
   a plurality of springs;
   a fixed electrode; and
   a movable electrode connecting to the springs,
   wherein the springs are movable in accordance with the physical quantity,
   wherein the fixed electrode and the movable electrode provide a capacitor having a capacitance therebetween so that the physical quantity is detectable on the basis of the capacitance,
   wherein the springs have different spring constants, respectively,
   wherein each of the springs is movable in accordance with the corresponding spring constant when the physical quantity is applied to the sensor,
   wherein the springs include a long spring and a short spring,
   wherein the long spring includes a pair of long beams, which provide a first loop with a beam distance between the long beams,
   wherein the short spring includes a pair of short beams, which provide a second loop with a beam distance between the short beams,
   wherein the springs further include a stopper, which is supported by the short spring,
   wherein the long spring is configured to be displaceable when the physical quantity is smaller than a predetermined value,
   wherein displacement of the long beam is limited by the stopper and the short spring is configured to be displaceable when the physical quantity is equal to or larger than the predetermined value.

2. The sensor according to claim 1, further comprising:
   a fixed electrode; and
   a movable electrode connecting to all of the springs,
   wherein the sensor is a capacitance type acceleration sensor,
   wherein the movable electrode faces the fixed electrode at a predetermined distance therebetween so that a capacitor having a capacitance is provided, and wherein all of the springs are movable in accordance with the acceleration so that the distance between the movable and fixed electrodes is changed.

3. The sensor according to claim 1,
wherein the sensor detects the physical quantity in a detection direction, and
wherein the springs have different longitudinal lengths perpendicular to the detection direction of the physical quantity, respectively.

4. The sensor according to claim 3,
wherein the beams extend perpendicular to the detection direction of the physical quantity, and
wherein at least one of the springs has a rectangular shape so that at least one of the first loop and the second loop is a rectangle.

5. The sensor according to claim 1, further comprising:
a massive portion; and
a substrate,
wherein the movable electrode protrudes from the massive portion,
wherein the massive portion connects to the springs, and
wherein the springs movably connect to the substrate.

6. The sensor according to claim 5,
wherein the sensor detects the physical quantity in a detection direction,
wherein the massive portion extends to the detection direction of the physical quantity,
wherein the movable electrode extends perpendicular to the detection direction of the physical quantity, and
wherein the springs extend perpendicular to the detection direction of the physical quantity.

7. The sensor according to claim 6,
wherein the springs include first and second springs,
wherein the first spring is disposed between the massive portion and the second spring,
wherein the second spring is disposed between the first spring and the substrate, and
wherein the first spring has a longitudinal length longer than that of the second spring.

8. A physical quantity sensor for detecting physical quantity, the sensor comprising:
a plurality of springs;
a fixed electrode;
a movable electrode connecting to the springs; and
a stopper,
wherein the springs are movable in accordance with the physical quantity,
wherein the fixed electrode and the movable electrode provide a capacitor having a capacitance therebetween so that the physical quantity is detectable on the basis of the capacitance,
wherein the springs have different spring constants, respectively,
wherein each of the springs is movable in accordance with the corresponding spring constant when the physical quantity is applied to the sensor,
wherein the springs include a first spring and a second spring,
wherein the stopper limits a motion of the first spring, and
wherein the second spring supports the stopper.

9. The sensor according to claim 8,
wherein the first spring is movable until the stopper contacts the first spring.

10. The sensor according to claim 8, further comprising:
a fixed electrode; and
a movable electrode facing the fixed electrode,
wherein the first spring and the second spring connect to the movable electrode.

11. The sensor according to claim 8,
wherein the sensor is a capacitance type acceleration sensor,
wherein the movable electrode faces the fixed electrode at a predetermined distance therebetween so that a capacitor having a capacitance is provided, and
wherein the first spring and the second spring are movable in accordance with the acceleration so that the distance between the movable and fixed electrodes is changed.

12. The sensor according to claim 8, further comprising:
a massive portion; and
a substrate,
wherein the movable electrode protrudes from the massive portion,
wherein the first spring connects to the massive portion, and the second spring movably connects to the stopper, and
wherein the first spring and the second spring movably connect to the substrate.

13. The sensor according to claim 12,
wherein the sensor detects the physical quantity in a detection direction,
wherein the massive portion extends to the detection direction of the physical quantity,
wherein the movable electrode extends perpendicular to the detection direction off the physical quantity, and
wherein the first spring and the second spring extend perpendicular to the detection direction of the physical quantity.

14. A physical quantity sensor for detecting physical quantity, the sensor comprising:
a plurality of springs, wherein the springs have different spring constants, respectively, wherein the springs include a first spring and a second spring, and wherein the first spring and the second spring are movable in accordance with the physical quantity;
a stopper, wherein the stopper limits a motion of the first spring, and wherein the second spring supports the stopper;
a fixed electrode;
a movable electrode connecting to the springs, wherein the fixed electrode and the movable electrode provide a capacitor having a capacitance therebetween so that the physical quantity is detectable on the basis of the capacitance, wherein the movable electrode protrudes from the massive portion;
a massive portion, wherein the first spring connects to the massive portion, and the second spring movably connects to the stopper; and
a substrate, wherein the first and second springs movably connect to the substrate,
wherein the first spring is disposed between the massive portion and the second spring,
wherein the second spring is disposed between the first spring and the substrate,
wherein the first spring has a longitudinal length longer than that of the second spring,
wherein the sensor detects the physical quantity in a detection direction,
wherein the massive portion extends to the detection direction of the physical quantity,
wherein the movable electrode extends perpendicular to the detection direction of the physical quantity, and wherein the first spring and the second spring extend perpendicular to the detection direction of the physical quantity.

15. A physical quantity sensor for detecting physical quantity, the sensor comprising:
a plurality of springs;
a fixed electrode;
a movable electrode connecting to the springs; and
a plurality of stoppers including first, second and third stoppers,
wherein the springs are movable in accordance with the physical quantity,
wherein the fixed electrode and the movable electrode provide a capacitor having a capacitance therebetween so that the physical quantity is detectable on the basis of the capacitance,
wherein the springs have different spring constants, respectively,
wherein each of the springs is movable in accordance with the corresponding spring constant when the physical quantity is applied to the sensor,
wherein the springs include first, second and third springs,
wherein the first stopper limits a motion of the first spring,
wherein the second stopper limits a motion of the second spring,
wherein the third stopper limits a motion of the third spring,
wherein the second spring supports the first stopper, and
wherein the third spring supports the second stopper.

16. The sensor according to claim 15, further comprising:
a substrate;
a fixed electrode; and
a movable electrode facing the fixed electrode,
wherein the first spring connects to the movable electrode, the second spring movably connects to the second stopper, and the third spring movably connects to the third stopper, and
wherein the third stopper is fixed to the substrate.

17. The sensor according to claim 16,
wherein the sensor is a capacitance type acceleration sensor,
wherein the movable electrode faces the fixed electrode at a predetermined distance therebetween so that a capacitor having a capacitance is provided, and
wherein the first, second and third springs are movable in accordance with the acceleration so that the distance between the movable and fixed electrodes is changed.

18. A physical quantity sensor for detecting physical quantity, the sensor comprising:
a plurality of springs;
a fixed electrode;
a movable electrode connecting to the springs;
a substrate; and
a plurality of stoppers including first and second stoppers,
wherein the springs are movable in accordance with the physical quantity,
wherein the fixed electrode and the movable electrode provide a capacitor having a capacitance therebetween so that the physical quantity is detectable on the basis of the capacitance,
wherein the springs have different spring constants, respectively,
wherein each of the springs is movable in accordance with the corresponding spring constant when the physical quantity is applied to the sensor,
wherein the springs include first and second springs,
wherein the first stopper is supported on the second spring,
wherein the first stopper limits a motion of the first spring,
wherein the second stopper limits a motion of the second spring, and
wherein the second stopper is fixed to the substrate.

19. The sensor according to claim 18, further comprising:
a fixed electrode; and
a movable electrode facing the fixed electrode,
wherein the springs connect to the movable electrode.

20. The sensor according to claim 19,
wherein the sensor is a capacitance type acceleration sensor,
wherein the movable electrode faces the fixed electrode at a predetermined distance therebetween so that a capacitor having a capacitance is provided, and
wherein the springs are movable in accordance with the acceleration so that the distance between the movable and fixed electrodes is changed.

* * * * *